United States Patent [19]

Shei et al.

[11] Patent Number: 4,757,800
[45] Date of Patent: Jul. 19, 1988

[54] AIR FLOW SYSTEM FOR A LOW PROFILE IMPINGEMENT OVEN

[75] Inventors: Steven M. Shei; Mitchell C. Henke; John W. Schindler, all of Fort Wayne, Ind.

[73] Assignee: Lincoln Foodservice Products, Inc., Fort Wayne, Ind.

[21] Appl. No.: 3,223

[22] Filed: Jan. 14, 1987

[51] Int. Cl.$^4$ .............................................. F24C 15/32
[52] U.S. Cl. ............................. 126/21 A; 34/223; 34/231; 99/443 C; 99/475; 432/194
[58] Field of Search ............ 431/171, 350; 126/21 A; 34/160, 223, 231; 219/400; 99/386, 443 R, 443 C, 474, 475, 477; 432/176, 194, 199, 159, 121, 136, 144, 145

[56] References Cited

U.S. PATENT DOCUMENTS

| | | | |
|---|---|---|---|
| 3,076,320 | 2/1963 | Conradi | 34/223 X |
| 3,149,932 | 9/1964 | Bachrich | 34/223 X |
| 3,884,213 | 5/1975 | Smith | 126/21 |
| 3,991,737 | 11/1976 | Del Fabbro | 126/21 A |
| 4,094,074 | 6/1978 | Schrader et al. | 34/33 |
| 4,094,077 | 6/1978 | Schrader et al. | 34/155 |
| 4,137,649 | 2/1979 | Fleissner | 34/158 |
| 4,197,659 | 4/1980 | Brinkhaus et al. | 34/160 X |
| 4,227,317 | 10/1980 | Fleissner | 34/155 |
| 4,380,877 | 4/1983 | Poux | 34/231 X |
| 4,409,453 | 10/1983 | Smith | 219/10.55 |
| 4,425,719 | 1/1984 | Klein et al. | 34/160 X |
| 4,462,383 | 7/1984 | Henke et al. | 126/21 |
| 4,474,498 | 10/1984 | Smith | 432/144 |
| 4,556,043 | 12/1985 | Bratton | 126/21 A |

FOREIGN PATENT DOCUMENTS 1056887 3/1954 France ............................ 34/160

*Primary Examiner*—Margaret A. Focarino
*Attorney, Agent, or Firm*—Jeffers, Hoffman & Niewyk

[57] ABSTRACT

A food preparation apparatus including a cooking chamber having a pair of openings in two opposite facing walls thereof. A conveyor extends through the side wall openings and the chamber for conveying a food product through the chamber. First and second pairs of impingement finger ducts are provided for forming a plurality of columnated air jets and for impinging the jets against discreet points of a food product supported on the conveyor. A first one of each of said pairs of ducts is disposed above the conveyor and a second one of each of said pairs of finger ducts is disposed below the conveyor. First and second plenums, each of which has a fan respectively associated therewith, supply air to the finger ducts. One or more baffles in each of the plenums guides and streamlines the air as it flows out of the plenums and through the finger ducts. A single burner is associated with the plenums for simultaneously supplying heat energy to both plenums.

18 Claims, 3 Drawing Sheets

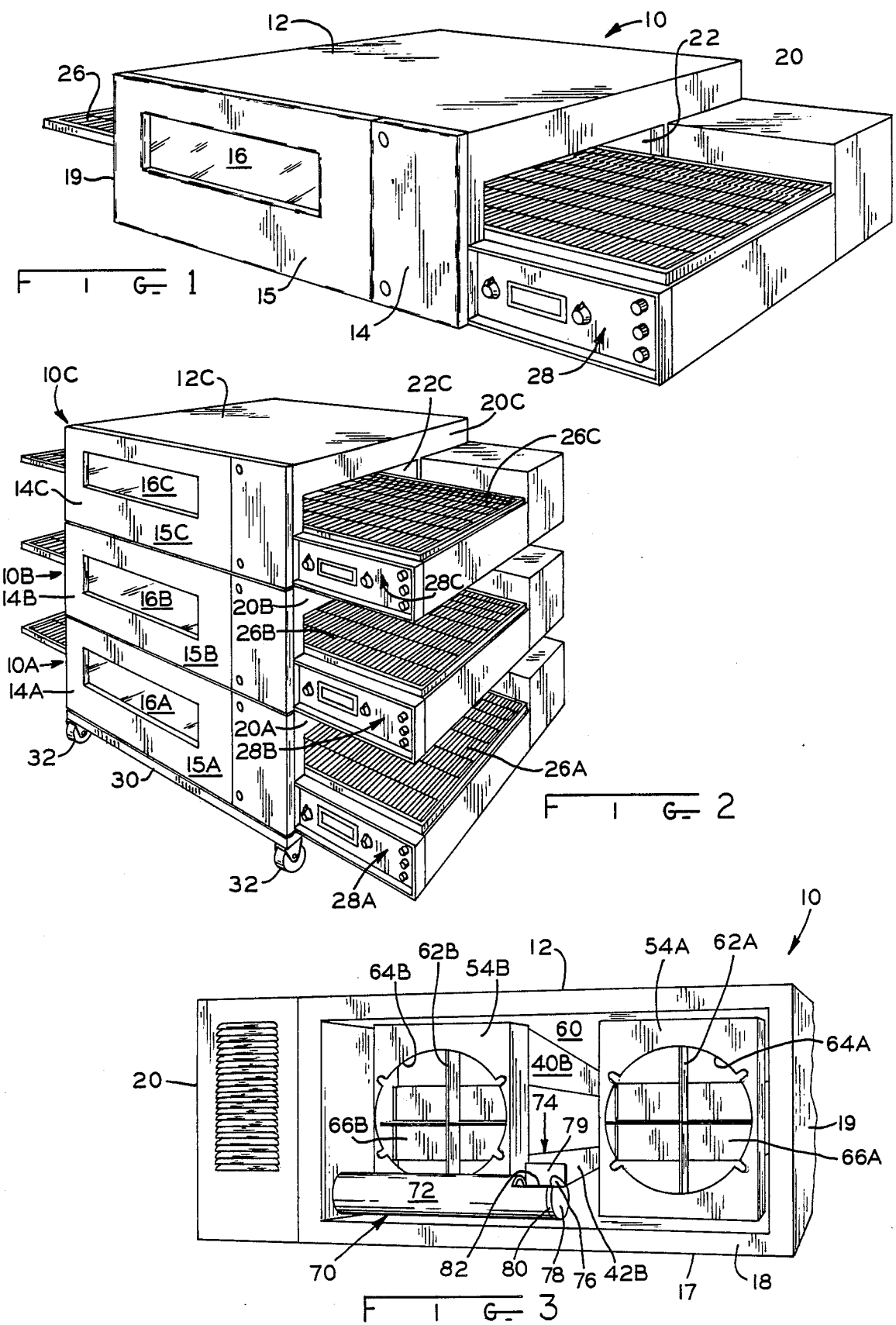

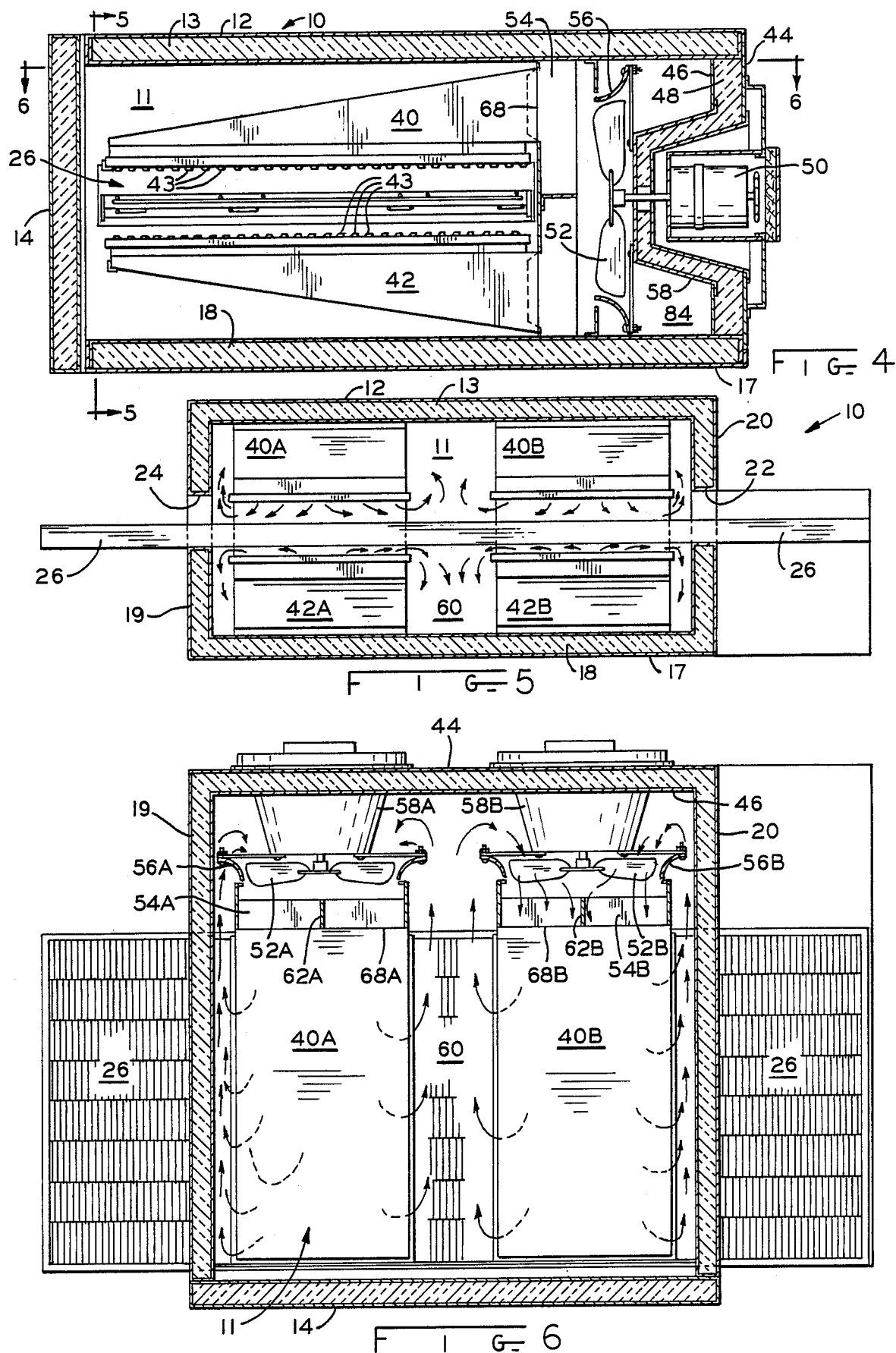

AIR FLOW SYSTEM FOR A LOW PROFILE IMPINGEMENT OVEN

BACKGROUND OF THE INVENTION

This invention relates to food preparation ovens and in particular to food preparation ovens for preparing pizza and similar types of food products. Specifically the invention relates to an impingement oven wherein food products are baked or cooked by means of jets of hot gaseous fluid such as hot air and wherein the hot air jets are impinged directly upon localized areas of the food product.

In the fast food restaurant business, it is both important that food is prepared very quickly and that the amount of kitchen space required for food preparation is minimized so that the productivity per square foot of kitchen floor space is maximized. It is, therefore, desired to provide a compact, efficient oven to maximize the productivity of restaurant kitchen floor space.

Advances have been made in the speed at which fast foods such as pizzas may be prepared by providing impingement ovens wherein a conveyor transports food products through an oven cavity. A plurality of impingement fingers are disposed above and below the conveyor for forming a plurality of columnated jets of heated air and for impinging the jets directly against discreet points of the food products as they travel slowly through the oven cavity. Such ovens generally include a single burner for heating the air and a single fan for distributing the air through a plenum to the impingement fingers. The time required to prepare food products in such impingement ovens is substantially smaller than the time necessary for baking food products in conventional prior art convection ovens. U.S. Pat. Ser. No. 4,556,043, which is assigned to the assignee of the present invention, discloses such an impingement oven which has been commercially very successful.

It is important in these types of impingement ovens that the velocity of the impingement air jets is sufficiently high to cause rapid heat energy transfer to the food products. Furthermore, it is important to provide proper air pressure distribution in the plenum and the impingement fingers to generate an even flow of air through the impingement fingers thereby forming evenly distributed impingement jets to thereby heat food products evenly throughout the oven cavity.

In conventional impingement ovens, the air, after its distribution through the plenum and the impingement fingers, flows back to the fan by way of the top, bottom, and sides of the oven. Some of the air escapes from the oven by way of the openings in the side walls of the oven through which the conveyor extends thereby resulting in lost energy and reducing the efficiency of the oven. It is therefore desired to provide an impingement oven wherein the return air flows primarily through the center of the oven to reduce energy losses. It is furthermore desired to provide an impingement oven of reduced height whereby a greater number of ovens may be stacked on top of each other to increase the productivity of the kitchen floor space without sacrificing food preparation time or food quality.

Axial fans are conventionally used with impingement ovens because of their superior air movement characteristics since they provide high velocity, low pressure air flow. The height of prior art impingement ovens has been dictated by the size of the axial fans which have been used with such ovens. Therefore, one potential approach to reducing the oven height is to use multiple axial fans, whereby each fan would have a smaller diameter than the single fan which is used with prior art impingement ovens. However, a problem with using multiple axial fans in impingement ovens is that a corkscrew air flow effect may be set up in the plenum, thereby creating uneven pressures in the impingement duct fingers and causing an uneven supply of thermal energy to the food product. Furthermore, multiple axial fans which rotate in the same direction tend to set up a lateral air flow across the oven cavity, thereby starving one of the fans from return air. It is, therefore, desired to provide an impingement food preparation oven including multiple axial fans and an even air flow distribution whereby thermal energy is distributed evenly to the food products.

The use of multiple axial fans which operate at conventional prior art speeds also tends to cause the oven to be noisy. This is especially undesirable in a commercial restaurant. It is, therefore, desired to provide an impingement oven with multiple axial fans which may operate at lower speeds than prior art impingement oven fans.

Some prior art ovens have been provided with multiple radial or centrifugal fans. However, a disadvantage of such fans is that they provide low velocity, high pressure air flow. In impingement ovens, it is desired to provide high velocity, low pressure air flow for transferring a maximum amount of thermal energy to the food products. Therefore, radial flow fans are unsatisfactory for use in impingement ovens.

Still another problem encountered in prior art impingement food preparation ovens has been that the differences in temperature throughout the back wall and the resulting differences in thermal expansion of various areas of the back wall, tend to warp the back wall. Since axial fans are generally mounted on the back wall and since a shroud which is mounted directly on the back wall generally surrounds the blades of the fan, such warping of the back wall may cause the blades of the fan to interfere with the shroud and may cause undesirable noise or slowing down of the fan, thereby potentially preventing the fan from rotating. It is, therefore, desired to provide a thermally stable mounting arrangement for the shroud of an axial fan in an impingement food preparation oven.

A still further problem encountered in the use of multiple fans in an impingement oven is that multiple fans generally requires the use of multiple conventional burners to heat the impingement air, thereby raising the manufacturing costs of the oven. It is difficult, when using a single burner, to distribute the heat from the burner equally to multiple duct fingers. Thus, it is desired to provide an oven with multiple axial fans, a single burner and an air distribution system whereby the impingement air is distributed evenly through the impingement fingers and generates an even distribution of impingement air jets.

SUMMARY OF THE INVENTION

The present invention overcomes the disadvantages of the above-described prior art impingement ovens by providing an improved oven therefor.

The invention, in one form thereof, comprises a food preparation oven including a cooking chamber and a conveyor for conveying food products through the chamber. A plurality of impingement fingers are disposed in the chamber for forming a plurality of columnated jets of air and for impinging the jets against discreet points of the food products supported on the conveyor. A plurality of plenums are provided for supplying hot air to the duct fingers. Each of the plenums has an axial fan associated therewith for supplying air to the plenum. Baffles are provided to guide and straighten the air which flows from the fans into the duct fingers. Furthermore, a single burner supplies thermal energy to all of the plenums.

The oven of the present invention, in one form thereof, further comprises a cooking chamber including a pair of openings located in opposite facing side walls thereof and a conveyor which extends through the side wall openings and oven cavity for conveying food products through the oven chamber. Two pairs of duct fingers are provided, each pair of fingers comprising one duct finger disposed above the conveyor and one duct finger disposed below the conveyor. Two plenums are provided and each pair of duct fingers is connected respectively to one of these plenums. Two axial fans supply air to the respective plenums and the associated pairs of duct fingers. In one arrangement, the fans rotate in the same direction. In this arrangement, a plurality of curved baffles are provided in each plenum to cause the air, as it flows from each fan, to be straightened before it flows into the duct fingers.

Alternatively, the fans may rotate in respective opposite directions whereby the air, after it exits from the duct fingers and impinges upon the food products, returns to the fans from the front to the back of the oven primarily centrally through the oven and the space which separates the ducts. In this arrangement, each of the plenums includes at least one baffle comprising an upstanding vertical planar member to guide and straighten the air as it flows from a fan through the associated plenum and into the associated fingers, thereby causing the air flow to be substantially non-turbulent and laminar or streamlined. The streamlined air flow causes an even distribution of air pressure in the fingers so that the air forms uniform impingement jets and heats the food products uniformly. The fans are mounted on the back wall of the oven and are surrounded by shrouds secured to cone-shaped mounting platforms which are attached to the back wall of the oven. The oven includes a single gas burner which is arranged so that the flame exits from the burner intermediate the two plenums whereby the thermal energy from the gas burner is distributed evenly between the two plenums. The burner includes an adjustable burner baffle whereby the flame may be deflected to divide its thermal energy equally between the two plenums.

One advantage of the present invention is that it enables reducing the height of an impingement oven while providing increased air impingement jet velocity and improved baking performance.

Another advantage of the present invention is that, by the use of baffles in the plenums, the corkscrew air flow effect generated by the axial fans is eliminated whereby even pressures are set up in the duct fingers.

A further advantage of the present invention is that, by the use of counter-rotating fans, the return air flow in the oven is primarily through the center of the oven whereby air loss from the oven is minimized and the energy efficiency of the oven is improved.

Still another advantage of the present invention is that either counter-rotating fans or fans which rotate in the same direction may be used while maintaining an even distribution of air to the duct fingers.

A still further advantage of the present invention is that the mounting arrangement for mounting the fans and fan shrouds on the oven back wall is thermally stable.

The invention, in one form thereof, comprises a food preparation oven comprising a cooking chamber and a conveyor for supporting a food product in the chamber. A plurality of air impingement fingers are disposed in the chamber for forming a plurality of columnated jets of air and for impinging the jets against discreet points of a food product supported on the conveyor. A plurality of plenums are operatively connected to the plurality of fingers for supplying air thereto. A plurality of fans are operatively associated with the plenums for supplying air to the plenums. Each of the plenums is associated with one of the fans whereby air impinged against a food product supported on the conveyor flows between at least two of the fingers as it returns to the fans.

The present invention, in one form thereof, further comprises a food preparation apparatus including an oven cavity and a conveyor in the oven cavity for supporting and conveying food products through the oven cavity. A plurality of air impingement fingers are disposed both above and below the conveyor for forming a plurality of columnated air jets and for impinging the jets against discreet points of a food product supported on the conveyor. First and second plenums are provided, each of which is respectively connected in air flow communication with a plurality of the fingers for supplying air thereto. First and second plenum baffles are respectively operatively associated with the first and second plenums for guiding the air as it flows from the plenums into the fingers. First and second axial fans are respectively operatively associated with the first and second plenums for supplying air thereto.

The present invention, in one form thereof, still further comprises a food preparation apparatus including a cooking chamber having a pair of openings in two opposite facing walls thereof. A conveyor is disposed in the chamber for conveying a food product through the chamber, the conveyor extending through the pair of side wall openings. First and second pairs of impingement finger ducts are provided for forming a plurality of columnated air jets and for impinging the jets against discreet points of a food product supported on the conveyor. A first one of each of the pairs of ducts is disposed above the conveyor and a second one of each of the pairs of ducts is disposed below the conveyor. First and second plenums are respectively operatively associated with the first and second pairs of ducts for supplying air thereto. First and second fans are respectively operatively associated with the first and second plenums. First and second baffles are respectively operatively associated with the first and second plenums for guiding air substantially linearly axially to each of the finger ducts. A single burner is operatively associated with the first and second plenums for heating the air supplied to the finger ducts.

It is an object of the present invention to provide an oven of reduced height and improved baking characteristics.

It is another object of the present invention to provide an oven of reduced height wherein multiple axial fans are used.

It is a further object of the present invention to provided an oven of reduced height wherein multiple fans are used together with a single burner.

Yet another object of the present invention is to provide an oven wherein the fan shrouds are mounted on thermally stable mounts.

Yet a further object of the present invention is to provide an oven wherein the air flow from the plenums into the fingers is substantially non-turbulent by the provision of at least one baffle in each of the plenums.

A still further object of the present invention is to provide an oven of reduced height wherein the fans rotate in mutually opposite directions to cause the return air to flow primarily through the center of the oven.

A yet still further object of the present invention is to provide an oven of reduced height wherein multiple fans rotate in the same direction.

Still another object of the present invention is to provide an oven wherein the thermal energy generated by a single burner may be apportioned between multiple plenums.

BRIEF DESCRIPTION OF THE DRAWINGS

The above-mentioned and other features and objects of this invention and the manner of obtaining them will become more apparent and the invention itself will be better understood by reference to the following description of an embodiment of the invention taken in conjunction with the accompanying drawings, wherein:

FIG. 1 is a perspective view of an oven incorporating a preferred embodiment of the present invention;

FIG. 2 is a perspective view of a stack of a plurality of the ovens of FIG. 1;

FIG. 3 is a perspective rear view of the oven of FIG. 1 with the back wall of the oven and the air moving fans removed;

FIG. 4 is a cross sectional side view of the oven of FIG. 1;

FIG. 5 is a cross sectional, front-elevational view of the oven taken along line 5—5 of FIG. 4 showing the air flow through the oven;

FIG. 6 is a sectional top plan view of the oven taken along line 6—6 of FIG. 4 showing the air flow through the oven;

Corresponding reference characters indicate corresponding parts throughout the several views of the drawings.

Figure 7:
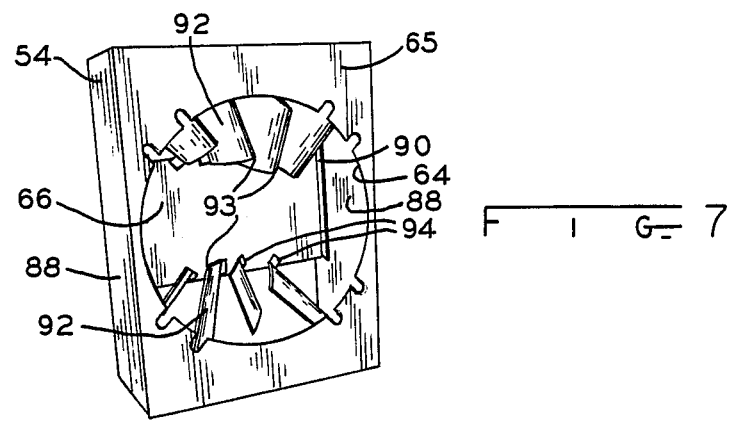
FIG. 7 is a perspective rear elevational view of a second embodiment of a plenum.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Referring to FIGS. 1, 2, and 4, impingement oven 10 is shown which includes an oven cavity 11 and a top wall 12. Top wall 12 is insulated with a layer of insulation material 13 which is located between the inner and outer panels of wall 12. The front wall of oven 10 is indicated at 14 and preferably includes a door 15. Door 15 also includes a window 16 for viewing food products as they travel through the oven. The bottom wall of the oven is indicated at 17 and includes a layer of insulation material 18. Side walls 19 and 20 of oven 10 are also suitably insulated and include respective openings 22 and 24 therein. A conveyor 26 extends through side wall openings 22 and 24 whereby food products may be placed on conveyor 26 so that they are conveyed through side wall opening 24 into oven cavity 11 to be baked therein. The food products leave oven cavity 11 through opening 22 in the opposite side wall 20 so that the food products may be removed from conveyor 26. The details of the construction of conveyor 26 do not form a part of the instant invention, and are further described in U.S. Pat. No. 4,462,383, which is assigned to the assignee of the instant application, which patent is incorporated herein by reference. A control panel 28 is provided for mounting the operating controls of oven 10 such as, by way of example but not by way of limitation, a temperature control and a conveyor speed control.

FIG. 2 shows a plurality of ovens 10 stacked on top of each other, with the entire stack of ovens 10a, 10b and 10c supported by a frame 30 which has a plurality of wheels 32 secured thereto so that the entire stacked assembly is moveable. By providing low profile impingement ovens the total stack height of the oven assembly of FIG. 2 is substantially reduced as compared to a stack of conventional impingement ovens. More importantly, the low profile oven arrangement of the invention permits stacking of a greater number of ovens than was previously possible, and thus saves kitchen floor space.

Referring now to FIGS. 3-6, the oven is provided with a plurality of finger ducts 40 and 42. Two finger ducts 40a and 40b are disposed above conveyor 26 and two finger ducts 42a and 42b are disposed below conveyor 26. Each of finger ducts 40 and 42 includes a plurality of impingement apertures 43 for forming a plurality of well defined, high velocity air jets for impingement upon localized areas of food products supported on conveyor 26 to thereby heat and bake the food products. The specific construction of fingers 40 and 42 does not form a part of the present invention and is more fully described in U.S. Pat. No. 4,154,861, which patent is incorporated herein by reference. The oven also includes a back panel 44 and an inner panel 46 between which insulation material 48 is located. Two electric motors 50a and 50b rotatably drive a pair of axial fans 52a and 52b which are respectively mounted behind and in alignment with a pair of plenums 54a and 54b. A pair of fan shrouds 56a and 56b are secured to a pair of frusto-conical shroud mounts 58a and 58b which guide air from fans 52 into fingers 40 and 42. The use of mounts 58 which are shaped as truncated cones forms an important part of the instant invention because, by mounting shrouds 56 thereto, thermal stability of the structure is achieved. If the shrouds were to be mounted directly on the flat interior panel 46 of back wall 44, the localized differences in temperature of back wall 46 which distort planar back wall 46, would cause the shrouds to move and thus potentially cause interference of the shrouds with the blades of fans 52, possibly even stopping the fan blades from rotating. By using a frusto-conically-shaped mount 58 for each shroud 56, the thermal dimensional stability of the shroud arrangement is much improved, thereby causing shroud 58 to have a fixed position relative to fan blade 52.

Plenums 54a and 54b are connected respectively to fingers 40a, 42a, and 40b, 42b, for supplying air thereto. Thus, as best shown in FIGS. 4, 5, and 6, air flows from fans 52a and 52b through plenums 54a and 54b, and duct fingers 40 and 42 to impinge upon the food products carried by conveyor 26. Air returns from oven cavity 11 through space 60 between fingers 40a, 40b and 42a, 42b, and along the outside walls 12, 17, 19, and 20 of oven 10 and flows back to axial fans 52a and 52b for reheating and recirculation thereof. The air is then forced back through plenums 54a and 54b into the respective fingers 40a, 42a, and 40b, 42b by fans 52a and 52b.

It can be seen by reference to FIGS. 3, 4, and 6 that each fan 52a and 52b is associated with a plenum 54a and 54b and supplies air to both a top duct finger 40 and a bottom duct finger 42. Thus, fan 52a supplies air to fingers 40a and 42a, and fan 52b supplied air to fingers 40b and 42b. In conventional prior art ovens only a single fan and plenum was used to supply air to all the duct fingers. However, by the utilization of two axial fans, 52a and 52b, air velocity, and therefore air mass transfer, may be increased whereby thermal energy transfer to the food products is increased and better baking characteristics will result.

In the embodiment of the invention disclosed in FIGS. 3-6, axial fans 52a and 52b are counter-rotating whereby one of the fans 52a and 52b will rotate in the clockwise direction and the other fan will rotate in the counterclockwise direction. By means of this arrangement, an oven air flow pattern is generated, as best shown in FIG. 6, whereby most of the air returning to fans 52a, 52b will flow from oven cavity 11 through the center space 60 of the oven respectively between ducts 40a, 40b and 42a, 42b. A small amount of air flows back to fans 52 around the outside walls 12, 17, 19, and 20 of oven 10. However, this latter amount of return air is much smaller than the air flowing through the center 60 of oven 10. An advantage of this air flow arrangement is that very little of the air will escape from oven 10 through openings 22 and 24. Thus, thermal energy loss from oven 10 is minimized and the energy efficiency of oven 10 is improved. It should also be noted that a gradient of air pressures exists across side wall openings 22 and 24. Thus, by providing most of the return air flow through the center of the oven, the negative air pressure generated at openings 22 and 24 in the side walls 18 and 20 of oven 10 will be relatively small and will draw only a relatively small amount of cool, ambient air into oven cavity 11, thereby limiting energy loss and further improving the efficiency of the oven as compared to prior art impingement ovens.

An important aspect of the invention is the provision of a pair of baffles 62a and 62b in plenums 54a and 54b as best shown in FIGS. 3 and 6. Baffles 62a and 62b are planar and are respectively located in the circular apertures 64a and 64b of plenums 54a and 54b. Panels 66a and 66b partially block circular apertures 64a and 64b. Baffles 62a and 62b and panels 66a and 66b are respectively secured to front walls 68a and 68b of plenums 54a and 54b. By using axial fans 52a, 52b, there is a tendency for the air to flow in corkscrew fashion as it leaves plenums 54a, 54b and enters impingement fingers 40a, 40b, 42a, and 42b. If no correction were provided, this corkscrew air flow pattern would set up an uneven distribution of air pressures in duct fingers 40a, 40b, 42a, and 42b, and therefore cause an uneven pattern of air impingement jets to be formed by the duct fingers. This would result in an uneven transfer of thermal energy to the food products as they travel through oven cavity 11, thereby adversely affecting the baking characteristics of oven 10. Therefore, planar plenum baffles 62a and 62b are provided and are aligned with the longitudinal axis of duct fingers 40a, 40b, 42a, and 42b, whereby the air, as it flows from plenums 54a and 54b respectively into duct fingers 40a, 42a and 40b, 42b will be straightened to flow in a non-turbulent laminar or streamlined fashion into the respective duct fingers. The streamlined air flow creates an even pressure pattern in fingers 40, 42 and results in the formation of uniform patterns of air impingement jets thereby uniformly transferring thermal energy to the food products located on conveyor 26 and resulting in improved baking characteristics of oven 10.

It should also be noted that the use of axial fans 52a, 52b in oven 10 is advantageous as compared to the use of radial fans because they provide high velocity, low pressure air, and high air mass flow rates to finger ducts 40a, 40b, 42a, and 42b. The characteristics of radial fans are such that they provide low air velocity at relatively high air pressures as compared with axial flow fans. Axial fans provide high air velocity at low air pressures. Since, in impingement types of ovens, it is desired to maximize the rate of thermal energy transferred to the food products, it is desired to maximize the air mass flow rate so that the rate of thermal energy transfer to the food product by the heated air is maximized.

Referring now to FIG. 3, the burner system for the oven is shown. Only a single burner is used to provide thermal energy to both plenums 56a and 56b. The burner is conventional except for burner sleeve assembly 70. The burner, including sleeve assembly 70, is the subject of patent application Ser. No. 003126 filed on even date herewith and assigned to the same assignee as the instant invention, which application is incorporated herein by reference. While reference may be had to the above-identified patent application for further details of the burner assembly, burner sleeve assembly 70 functions as follows. Burner sleeve assembly 70 includes a burner outer housing tube 72 having an end cap 74 secured thereto by any suitable means such as threaded fasteners, spot welding or the like. End cap 74 includes a tab or burner baffle 76, an end wall 78, and a flange portion 80 for securing end cap 74 to burner outer housing tube 72. End wall 78 includes a substantially horizontal bending line portion whereby burner baffle 76 may be bent at an angle with respect to the vertical plane which extends through the bending line portion. Thus, a flame generated in burner outer housing tube 72 will strike end wall 78 and be diverted upwardly thereby and strike burner baffle 76. Baffle 76 deflects the flame as it emerges from aperture 82 so that part of the flame is directed back toward plenum 54b, and the remaining part of the flame is directed toward plenum 54a. If baffle 76 were not provided, the flame emanating from aperture 82 in burner outer housing tube 72 would be directed primarily toward plenum 54a, thereby starving thermal energy from plenum 54b. Baffle 76 may be adjusted after assembly of the oven to insure substantially equal temperatures of the air impingement jets formed by fingers 40a, 40b, 42a, and 42b.

A diverting baffle 79 is also provided for burner sleeve assembly 70. Diverting baffle 79 is secured to burner outer housing sleeve 70 in any suitable manner such as, for instance, by welding or by bending the struck out material from flame opening 82 and arranging it as a planar tab 79. It should be noted that diverting baffle 79 is located forwardly of flame opening 82. Furthermore, baffle 79 is located in the air stream which returns from oven cavity 11 through space 60 between the respective duct fingers 40a, 40b and 42a, 42b and plenums 54a and 54b. Thus, the position of baffle 79 is perpendicular to the flow of return air and thereby, by Bernoulli's principle, creates a negative pressure zone forwardly of flame opening 82. Therefore, as the flame exits from opening 84, it will be drawn toward zone 84 and thereby be diverted away from back wall inner panel 46. Thus, undesirable spot heating and warping of back wall panels 44 and 46 is prevented by the very simple expedient of providing a diverting baffle 79.

It should also be noted that, by the provision of baffle 76, temperature zoning in oven 10 may be provided by adjustment of baffle 76. Thus, the thermal energy generated by the burner assembly may be apportioned between plenums 54a and 54b as desired. Therefore, the amount of heat energy impinged by the pairs of duct fingers 40a, 42a, and 40b, 42b upon food products carried by conveyor 26 may be varied. Thus, temperature zones may be provided in the oven. It should further be noted that, by the provision of two fans 52a, 52b, which could be selected to operate at different speeds, the velocity of the air flowing from impingement fingers 40a, 42a, and 40b, 42b could be varied. Thus, by varying the oven air flow pattern, further zoning for adjusting the baking process in the oven could be provided. For instance, as a food product enters oven cavity 11, it may be desired to initially heat a food product relatively slowly and thereafter to maximize thermal energy transfer to the food product in the last portion of oven cavity 11. Conversely, it may be desired to first maximize thermal energy input to a food product and thereafter to decrease thermal energy transfer as the food product travels through the oven cavity, depending on the food product to be prepared. Thus, the oven is versatile and may be adjusted for the preparation of various types of foods to provide the proper baking cycle therefor. It should also be noted that, while four (4) finger ducts are shown in the disclosed embodiment, this number may be increased or decreased as desired.

Figure 8:
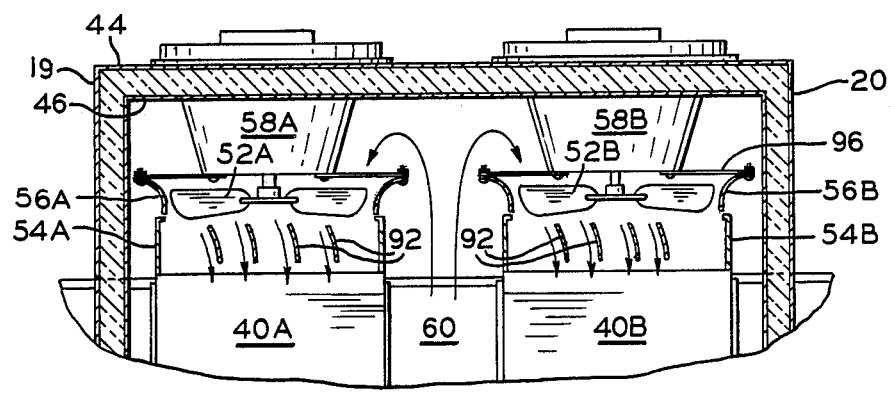
FIG. 8 is a partial sectional top plan view of the oven plenum and air moving fan according to the second embodiment.
Figure 9:
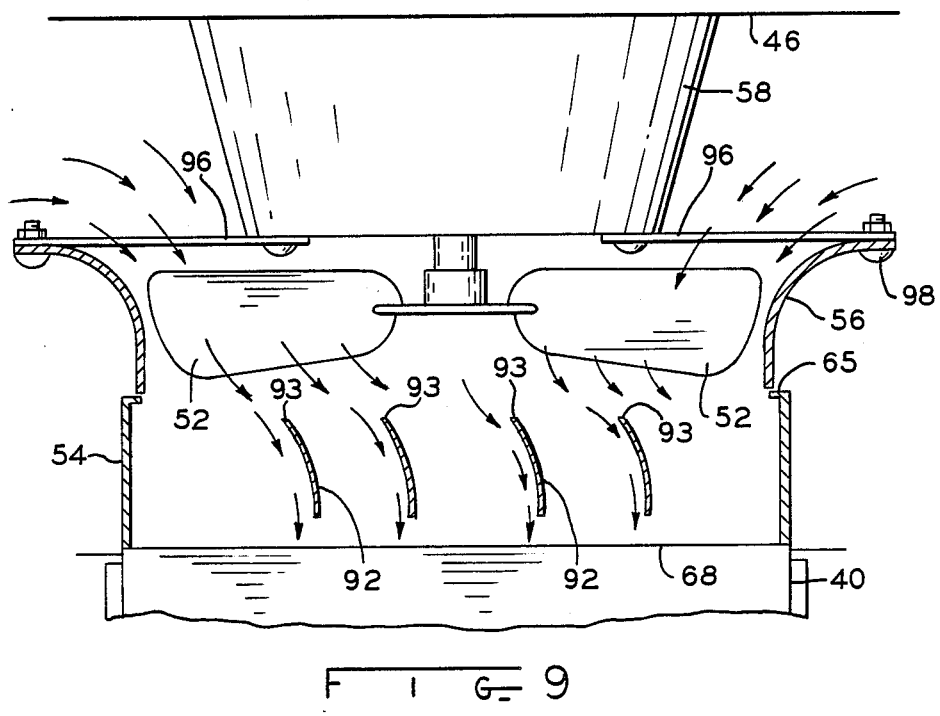
FIG. 9 is an enlarged sectional view of a fan and plenum of the embodiment of FIG. 8.

Referring now to FIGS. 7, 8, and 9, a second embodiment of the baffle structure for eliminating the corkscrew effect of axial fans 52a and 52b and for straightening the air flow is shown. Plenums 54a and 54b include panels 66a and 66b including flanges 90 which are secured to the side walls 88 of plenums 54 by means of spot welding or with threaded fasteners. A plurality of baffles 92 are also secured to panels 66 as best shown in FIG. 7. Baffles 92 are curved and include tabs 94 which are secured by spot welding, threaded fasteners, or other suitable means to panels 66. As best seen in FIG. 8, baffles 92 are positioned so that their rear edges 93 are aligned in a plane which is parallel to the plane of plenum rear walls 65 and circular apertures 64 located therein. Thus, the blades of fans 52 will clear the rear edges 93 of baffles 92. In FIG. 9, it can be clearly seen by the direction of the arrows that the flow of air through fan 52 will be directed at an angle with respect to the axis of finger 40. By mounting the curved baffles 92 as shown, the air flow is straightened gradually by the curved surfaces of baffles 92 whereby the baffles present a minimum of resistance to the air flow and efficiently straighten the flow of air so that the air flows into fingers 40 and 42 parallel to the longitudinal axes thereof. In the preferred embodiment disclosed, four vanes are provided for each duct finger 40a, 40b, 42a, and 42b. However, more or fewer baffles could be provided. It should also be noted that in the embodiment of FIGS. 7-9, the direction of rotation of fans 52a and 52b is identical. Thus, identical motors 50 may be used to drive fans 52a and 52b. Furthermore, by means of this arrangement of baffles 92, the speed of motors 50 at which fans 52 are driven may be reduced since the air flow pattern is quite efficient. For instance, the rotational speed of fans 52, with the baffle arrangement of FIGS. 7-9, may be 2800 rpm, as compared to conventional fan speeds of 3000 rpm. Because of this reduction in the rotational speed of electric motors 50 and fans 52, oven 10 is less noisy in operation than conventional impingement ovens. This, of course, is very desirable, particularly in kitchen environments.

It should also be noted that shrouds 56 are secured to frusto-conical mounts 58a and 58b by means of brackets 96 and fasteners 98. As explained hereinabove, this structure is thermally stable as the frusto-conical shape of mounts 58 does not distort to the extent of planar oven wall 46 with changes in temperature. Therefore, potential interference of the shrouds with the fan blades due to structural thermal instability is eliminated.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A food preparation apparatus comprising:
   a cooking chamber including a pair of openings in two opposite facing walls thereof;
   conveyor means disposed in said chamber for conveying a food product through said chamber, said conveyor means extending through said pair of openings;
   first and second pairs of impingement ducts for forming a plurality of columnated air jets and for impinging said jets against discreet points of a food product supported on said conveyor, a first one of each of said pairs of ducts disposed above said conveyor and a second one of each of said pairs of ducts disposed below said conveyor;
   first and second plenums respectively operatively associated with said first and second pairs of ducts for supplying air thereto;
   first and second axial fans respectively operatively associated with said plenums;
   first and second plenum baffle means respectively operatively associated with said first and second plenums for guiding air substantially axially to each of said impingement and
   a single burner operatively associated with said first and second plenums for heating the air supplied to said finger ducts.

2. The apparatus according to claim 1 wherein each said first and second plenum baffle means comprises first and second substantially flat planar vertically oriented baffles respectively associated with said first and second pairs of impingement ducts and respectively secured to said first and second plenums substantially at the midpoint of said fingers and plenums.

3. The apparatus according to claim 2 wherein said fans are axial fans which rotate in respective opposite directions.

4. The apparatus according to claim 1 wherein each said first and second plenum baffle means comprises a plurality of curved baffles arranged in said plenums for guiding the air through said plenums axially into each of said respective finger ducts associated with said first and second plenums.

5. The apparatus according to claim 4 wherein said fans rotate in the same direction.

6. The apparatus according to claim 1 including first and second fan shrouds mounted on frusto-conical mounts secured to the back wall of said apparatus.

7. A food preparation oven comprising:
a cooking chamber;
means for supporting a food product in said chamber;
a plurality of air impingement fingers disposed in said chamber for forming a plurality of columnated jets of air and for impinging said jets against discreet points of a food product supported on said support means;
a plurality of plenum means operatively connected to said plurality of fingers for supplying air thereto;
means for heating said air supplied to said impingement fingers;
a plurality of axial fans operatively associated with said plenum means for supplying air thereto, each of said plenum means being associated with one of said fans whereby air impinged against a food product flows between at least two of said fingers as it returns to said fans; and
a baffle means in at least one of said plenum means for guiding and straightening air flowing into the fingers associated with said at least one plenum means.

8. The oven according to claim 7 wherein said plurality of plenum means comprises two plenums, each of said plenums having at least one fan associated therewith, and each of said plenums supplying air to a plurality of said fingers.

9. The oven according to claim 7 wherein said fans rotate in respective opposite directions.

10. The oven according to claim 7 wherein said plenum baffle means comprises a substantially flat, planar, vertically oriented baffle secured to said plenum means substantially at the midpoint of said plenum means.

11. The oven according to claim 7 wherein said plenum baffle means comprises a plurality of curved baffles for each said finger associated with said one plenum means.

12. The oven according to claim 7 including a plurality of fan shrouds, each of which is operatively associated with one of said fans, said shrouds being mounted on frusto-conical mounts.

13. A food preparation apparatus comprising:
an oven cavity;
a conveyor in said oven cavity for supporting and conveying food products through said oven cavity;
a plurality of air impingement fingers disposed both above and below said conveyor for forming a plurality of columnated air jets and for impinging said jets against discreet points of a food product supported on said conveyor;
first and second plenums, each of which is respectively connected in air flow communication with a plurality of said fingers for supplying air thereto;
means for heating air supplied to said impingement fingers;
first and second plenum baffle means respectively operatively associated with said first and second plenums for guiding air from said plenums and into said fingers, said first and second baffle means each comprising a substantially flat vertically oriented baffle secured at substantially the midpoint of each respective said first and second plenum;
first and second axial fans respectively operatively associated with said first and second plenums for supplying air thereto.

14. The apparatus according to claim 13 including a single burner operatively associated with both said first and second plenums for heating said air supplied to said plenums.

15. The apparatus according to claim 13 wherein said fans rotate in respective opposite directions.

16. The apparatus according to claim 14 wherein said first and second baffle means each comprises a plurality of curved baffles arranged in the flow path of each of the associated impingement fingers of each said first and second plenums, said baffles guiding said air into axial alignment with said fingers as it flows from said fans through said plenums into said impingement fingers.

17. The apparatus according to claim 16 wherein said fans rotate in the same direction.

18. The apparatus according to claim 13 including a plurality of fan shrouds, each said fan shrouds associated with one of said fans, and mounted on a truncated cone-shaped mount.

* * * * *

UNITED STATES PATENT AND TRADEMARK OFFICE
CERTIFICATE OF CORRECTION

PATENT NO. : 4,757,800

DATED : July 19, 1988

INVENTOR(S) : Steven M. Shei et al

It is certified that error appears in the above-identified patent and that said Letters Patent is hereby corrected as shown below:

Claim 1, Col. 10, line 60, after "impingement" insert --ducts;--.

Signed and Sealed this

Thirteenth Day of December, 1988

Attest:

DONALD J. QUIGG

*Attesting Officer*  *Commissioner of Patents and Trademarks*